R. GIBBONS.

ADJUSTABLE ELASTIC STRAP FOR GARMENTS.

Reissued July 18, 1876.

No. 7,233.

Witnesses:
M. Gardner,
P. Mason.

Inventor:
Rodmond Gibbons,
by G. H. W. T. Kent,
Atty.

N. PETERS, PHOTO-LITHOGRAPHER, WASHINGTON, D. C.

UNITED STATES PATENT OFFICE.

RODMOND GIBBONS, OF SAN FRANCISCO, CALIFORNIA.

IMPROVEMENT IN ADJUSTABLE ELASTIC STRAPS FOR GARMENTS.

Specification forming part of Letters Patent No. 54,142, dated April 24, 1866; reissue No. 7,233, dated July 18, 1876; application filed June 15, 1876.

*To all whom it may concern:*

Be it known that I, RODMOND GIBBONS, of San Francisco, in the county of San Francisco and State of California, have invented certain new and useful Improvements in Elastic Adjustable Straps for Vests and other wearing-apparel; and that the following is a full, clear, and exact description of the same, reference being had to the accompanying drawings, making a part of this specification, in which—

Figure 1:
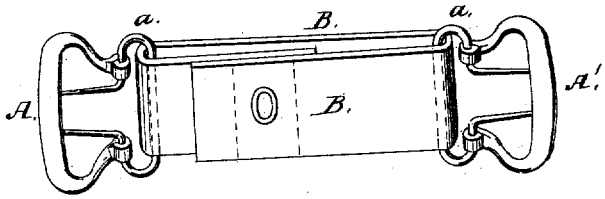
Figure 2:
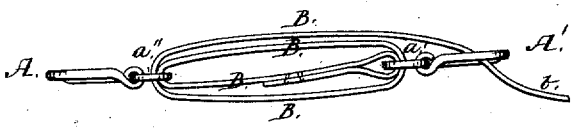

Figure 1 represents one of the straps in question, and Fig. 2 a modification thereof.

I am aware that elastic straps with eyelets, hooks, or button-holes have been made and used on wearing-apparel; but they lacked not only adjustability, but also the means of making them so, except some special devices were attached to the wearing-apparel to make them adjustable. To such straps I make no claim.

My object is to make an adjustable elastic strap that can be applied to garments already made, or, in other words, to make an adjustable elastic strap ready at once, and without any other appliances than those usually found on wearing-apparel already made, so that they may be attached, removed, replaced, and adjusted at pleasure.

My invention consists in uniting two buckles by an elastic strap, so that by means of the straps found upon pants and vests, or by means involved in the insertion or application of the strap to the buckles, said strap may be adjusted to suit the comfort or convenience of the user.

To enable others skilled in the art to make and use my invention, I will proceed to describe the same with reference to the drawings.

In Fig. 1, A A′ represent two buckles united by an elastic strap, B, in the form of a loop or belt, the ends of which, after passing through the loops *a* of the buckles, are either sewed, eyeleted, or otherwise fastened together. This strap is applied to the straps universally found upon wearing-apparel, and can, by means of the buckles, be adjusted thereon at pleasure.

In Fig. 2 the buckles A A′ are united by an elastic strap, B, fastened permanently to the loop of one buckle only, *a′*, then passed through the loop *a″* of the other buckle, thence through the loops *a′* and *a″* a second time, and the end *b* of the strap is then taken to the buckle A′, and caught upon the tongues of said buckle. By this means the strap is made shorter or longer within itself, instead of upon the vest or pantaloons straps, as above described. Either form makes the elastic strap adjustable to the garment, and either can be applied without any other devices than those found in the garments. It is, in fact, a commercial article, ready to be applied at once to pants, vests, or similar articles of wearing apparel.

Having thus described my invention, what I claim as new, and wish to secure by Letters Patent of the United States, is—

A new article of manufacture consisting of an elastic strap having a buckle at each end, or such equivalent therefor as adapts the strap for adjustability to the right and left tags of vests, pantaloons, or other garments, constructed for application to such garments, substantially in the manner and for the purposes described.

In testimony whereof I have hereto subscribed my name this 1st day of June, in the year of our Lord, 1876.

RODMOND GIBBONS.

Witnesses:

THEODORE MUNGEN,
GEORGE H. HOWARD.